3,002,524
FULL OR PARTIAL FLOW REGULATING DEVICE
Fred W. Diesing, East Williston, and Torsten Lindbom, Blue Point, N.Y., assignors to Fairchild Stratos Corporation, a corporation of Maryland
Filed Apr. 29, 1957, Ser. No. 655,881
13 Claims. (Cl. 137—219)

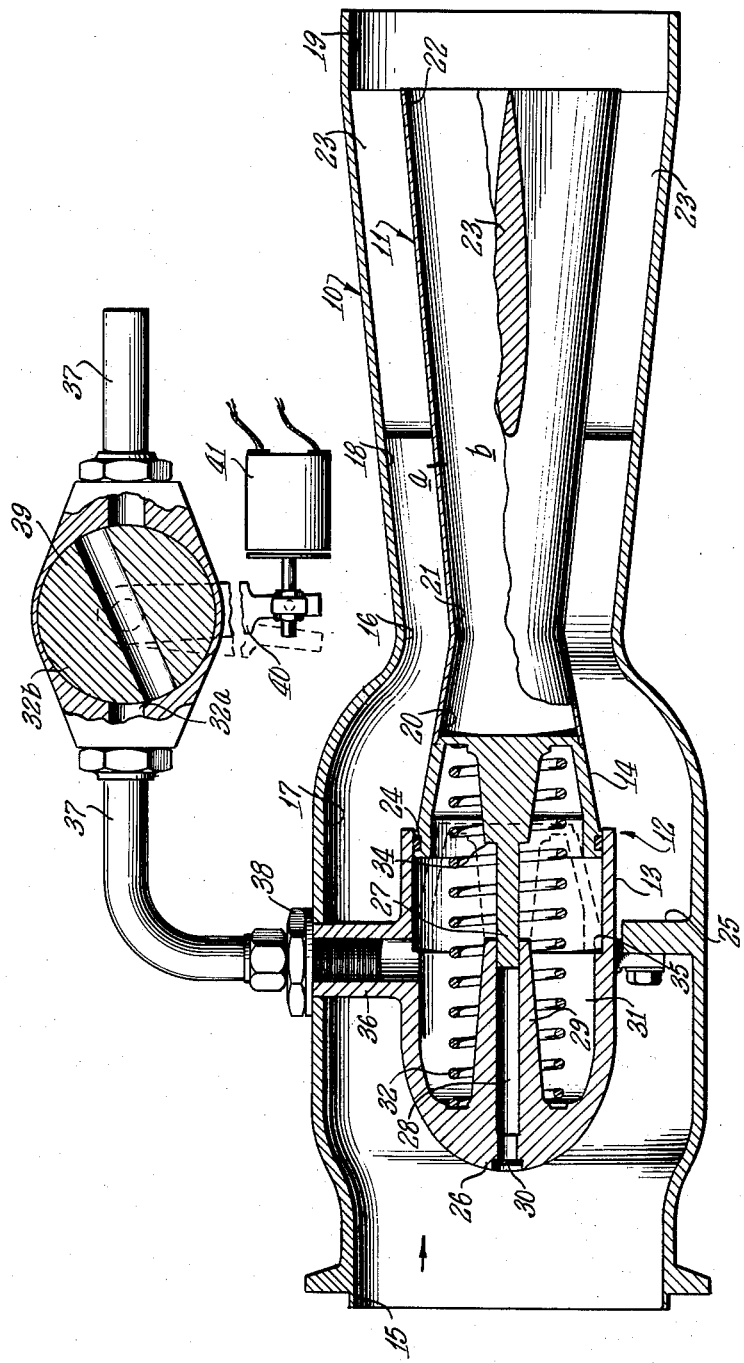

This invention relates to fluid flow regulating devices generally and, more particularly, to a fluid flow regulating device equipped with control means which is adjustable to provide a full or partial flow of fluid therethrough.

The present invention is particularly applicable to air conditioning systems in which it is desired to control the rate of flow of the fluid independent of the pressure downstream of the fluid flow regulating device.

The fluid flow regulating device of the present invention comprises in essence one venturi tube situated within another, forming two passages for the flow of fluid therethrough—an inner passage through the inner venturi tube and an outer passage between the inner and outer venturi tubes, in combination with movable valve means for opening and closing at least one of said passages for the flow of fluid therethrough and a controlled actuator for moving said valve means to open and closed positions to afford full or partial flow of the fluid through the fluid flow regulating device.

For a complete understanding of the present invention, reference may be made to the detailed description which follows and to the accompanying drawing which is a cross-sectional view of the flow regulating device of the present invention.

The flow regulating device of the present invention comprises generally an outer venturi tube 10 of circular cross-section, an inner venturi tube 11 of circular cross-section situated concentrically within the outer venturi tube, and an actuator device generally designated 12 comprising a stationary housing 13 and a movable valve 14, the outer surface of which tapers in a downstream direction. The concentric venturi tubes 10 and 11 form two passages, designated a and b, for the flow of the fluid through the flow regulating device. The passage a is formed between the inner and outer venturi tubes or, in other words, between the inner surface of the outer tube and the outer surface of the inner tube. The passage b is the passage through the inner tube.

The valve 14 is movable between the closed position shown in solid lines in the drawing and the open position shown in broken lines. In the closed position of the valve, the fluid will flow through the passage a only, but in the open position of the valve the fluid is free to flow through both the passages a and b. If, therefore, the inlet end of the outer venturi tube 10 is in communication with a supply of fluid at constant pressure higher than the pressure at the discharge end of the device, the quantity of flow through the flow regulating device will be greater when the valve 14 is open than when it is closed. In fact, by proper design of the device, the ratio between the quantity of flow through the device when the valve is open and when it is closed may be fixed at some predetermined value, for example, 2:1.

The outer venturi tube comprises an inlet end 15, a throat or constriction 16, a portion 17 of enlarged diameter upstream of the throat, a gradually divergent portion 18 downstream of the throat, and a discharge end 19. The inner venturi tube 11 comprises an inlet end 20, a throat 21 and a discharge end 22. The inner venturi tube is uniformly convergent between the inlet end 20 and the throat 21, and uniformly divergent between the throat 21 and the discharge end 22.

The inner venturi tube 11 is supported within the outer venturi tube 10 by means of the radial struts 23 which are of airfoil configuration. The disposition of the inner venturi tube is such that the inlet end 20 is just upstream of the throat 16 of the outer tube, and the throats 16 and 21 of both tubes are substantially on the same plane perpendicular to the axis of both tubes. The discharge end 22 of the inner tube is just upstream of the discharge end 19 of the outer tube.

The valve 14 is in the form of a hollow, tapered plug which is movable within one end of the hollow housing 13. An annular ring 24 forms a partially effective seal between the interior of the housing 13 and the fluid within the portion 17 of the outer venturi surrounding the valve 14. The housing 13 is fixedly mounted within the enlarged portion 17 of the outer venturi by bolting it to internal bosses 25 formed integrally with the inner periphery of the outer venturi. The upstream end 26 of the housing 13 is rounded so that the fluid stream, in passing through the upstream portion 17 of the outer venturi tube 10, is guided around the outer pheriphery of the housing 13.

The center of the movable valve 14 carries a stepped male member 27, the extreme end of which is guided for axial movement within the bore 28 of an annular female member 29 which is formed integrally with the closed end of the housing 13. The telescoping movement of the member 27 within the member 29 guides the valve 14 in its movement toward and away from the inlet end 20 of the inner venturi tube 11. The bore 28 extends axially through the closed end of the housing 13 so that the member 27 is free to move therein without opposition from any fluid entrapped within the bore. The extreme end of the bore 28 is provided with a filter 30 which prevents foreign particles carried by the fluid stream from entering the bore 28.

The movable valve 14 is shown in the drawing in a position closing the inlet end 20 of the inner venturi tube. The valve 14 is normally urged to this position by the combined forces exerted by the pressure of the fluid within the chamber 31 of the housing 13 and the action of a compressed spring 32 which is accommodated within the hollow chamber 31 surrounding the telescoping members 27 and 29. One end of the compression spring acts against the closed end of the housing 13, and the opposite end thereof acts against the movable valve 14 to urge it to closed position. When, however, the pressure within the chamber 31 is sufficiently reduced so that the pressure surrounding the valve 14 exerts an opening force on the valve which exceeds the combined forces exerted by the spring and the pressure within the chamber 31, the valve 14 moves to its extreme open position as indicated by the broken lines in the drawing. In moving to this position, the spring 32 is compressed. The extreme open position of the valve 14 is determined by the engagement of the shoulder 34 of the member 27 with the extreme end of the annular formation 29, or by the engagement of the open end of the valve 14 with the internal shoulder 35 formed within the chamber 31.

Turning now to the means for reducing the pressure within the chamber 31 to open the valve in the manner described above, the housing 13 is formed with a hollow neck portion 36 which, in turn, is connected to one end of a conduit 37 by means of a fitting 38. The opposite end of the conduit communicates with a source of pressure which is substantially below the pressure head of the fluid within the portion 17 of the outer venturi surrounding the tapered surface of the valve 14. A valve 39 is interposed in the conduit 37, and the valve 39 is controlled by an operating handle 40 which is actuated by an electrical solenoid 41. When the handle is in the position shown in solid lines in the drawing, the valve 39 is closed, and when the actuating handle is moved to the position indicated in broken lines the valve is open.

The operation of the valve 39 controls the operation of the valve 14 to open and closed position. When the valve 39 is closed, leakage through the sealing ring 24 will eventually bring the pressure head within the chamber 31 to approximately the same level as the static pressure head surrounding the housing 13. Under these conditions, the valve 14 is urged to closed position by the action of the spring 32. When, however, the valve 39 is moved to open position, the pressure within the chamber 31 is substantially decreased so that the external pressure acting on the tapered valve will exert an unbalanced force on the valve capable of overcoming the closing action of the spring. Under these conditions the valve 14 will be held in the open position.

We turn now to a description of the operation of the fluid flow regulating device of the present invention when the inlet end 15 of the outer venturi tube 10 is in communication with a supply of fluid at a constant pressure, which pressure is higher than the pressure beyond the discharge end 19 thereof. Assuming the valve 39 to be closed, the leakage of fluid through the seal 24 will build up the pressure head within the chamber 31 to the value of the static pressure head surrounding the external tapered surface of the valve 14. The spring 32, therefore, will insure that the valve 14 is held in position to close off the inlet end 20 of the inner venturi tube 11. Thus, fluid will be permitted to flow through the outer passage a only, with the result that the quantity of flow is appreciably less than full flow. When, however, the valve 39 is opened, the chamber 31 is appreciably reduced, with the result that the pressure which acts on the outer tapered surface of the valve 14 is effective to move the valve 14 against the action of the spring 32 to open position. When the valve is in open position, the inlet end 20 of the inner venturi tube is unblocked, so that the fluid is permitted to flow through both the inner and outer venturi tubes, affording maximum or full flow through the fluid flow regulating device of the present invention.

The partially effective sealing ring 24 affords a very satisfactory and practical passage for introducing the fluid under pressure into the chamber 31. Since, when the valve 39 is open, there is a continuous flow of fluid through this passage into the chamber 31, it is important that the effective area of this passage be substantially less than the effective area of the passage formed by the neck 36 and the conduit 37 through which the fluid is exhausted from the chamber 31. Also, it is understood that if a more effective seal were provided, the frictional resistance to the movement of the valve 14 would be much greater. However, if desired, a one-way valve having a restricted passage therethrough when open may be provided in the housing 13, in lieu of relying on the leakage through the sealing ring 24.

The fluid flow regulating device of the present invention may have various applications in fluid systems. It has particular application to air conditioning systems in which it is desired to utilize the pressure of the fluid upstream of the regulating device to regulate the flow independent of the pressure downstream thereof. In such systems, the source of pressure upstream of the flow regulating device is preferably constant and may be supplied by the discharge of a compressor. The venturi tubes 10 and 11 insure maximum pressure recovery at flows below sonic.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

We claim:

1. A fluid flow regulating device comprising a source of fluid at a predetermined pressure, an outer venturi tube, an inner venturi tube, the upstream ends of said inner and outer venturi tubes communicating with said source of fluid, said inner and outer venturi tubes forming two passages, one through the inner venturi tube and the other between the inner and outer venturi tubes, a valve at the inlet end of the inner venturi tube, said valve in open position permitting the flow of fluid through both of said passages, and in closed position permitting the flow of the fluid through the passage defined between the inner and outer venturi tubes only, a variable pressure chamber for controlling the movement of said valve to open and closed positions, and means for varying the pressure within said chamber.

2. A fluid flow regulating device comprising an outer tube having a throat portion formed therein intermediate its inlet and discharge ends, an inner tube having a throat portion formed therein intermediate its inlet and discharge ends, said inner tube being shorter in length than said outer tube, said outer tube including an enlarged portion upstream of the throat, means for supporting the inner tube concentrically within said outer tube, with the inlet end of the inner tube being accommodated within the enlarged portion of said outer tube, a housing mounted within the enlarged portion of said outer tube, a movable valve at one end of said housing, said valve being movable toward the inlet end of said inner tube to close the passage through the inner tube and away from the inlet end of the inner tube to open the passage therethrough, a pressure chamber formed within said housing to control the operation of said valve, and means for varying the pressure within said chamber.

3. A fluid flow regulating device as set forth in claim 2 wherein the outer peripheral surface of the valve is tapered in a downstream direction whereby the static pressure head within the enlarged portion of the outer tube normally urges said valve in an upstream direction to open position.

4. A fluid flow regulating device as set forth in claim 2 including restricted passage means for admitting fluid from the enlarged portion of said outer tube into said chamber.

5. A fluid flow regulating device as set forth in claim 2, said pressure varying means including passage means communicating with said chamber for exhausting fluid therefrom.

6. A fluid flow regulating device as set forth in claim 5 wherein said passage means communicates with a source of pressure which is substantially lower than the static pressure head within the enlarged portion of the outer tube and valve means interposed in said passage means.

7. A fluid flow regulating device as set forth in claim 2 including oppositely disposed companion guide means in telescoping relationship with each other to guide the valve relative to said housing.

8. A fluid flow regulating device as set forth in claim 2 including spring means acting between said housing and said valve to urge the valve toward one of its extreme positions.

9. Apparatus in accordance with claim 6, in which the inlet and discharge ends, partition means within said conduit downstream of said inlet end to define at least two flow passages, a valve accommodated within said conduit downstream of said inlet end thereof for regulating the flow through one but not the other of said flow passages, means defining a restriction in the other of said flow passages downstream of said valve, said valve having a tapered surface exposed to the fluid within the conduit upstream of the restriction to permit the pressure of the fluid to exert an opening force on the valve, means defining a chamber for guiding the valve longitudinally in its movement toward open position, the pressure within the chamber influencing the actuation of said valve, and means for varying the pressure within the chamber.

10. A flow regulating device comprising a conduit having inlet and discharge ends, partition means within the conduit downstream of said inlet end to define at least two flow passages for a fluid, a valve accommodated within said conduit downstream of said inlet end thereof for regulating the flow through one but not the other of said passages, means defining a restriction in the other of said flow passages downstream of said valve, said valve having a tapered surface exposed to the fluid within the conduit upstream of the restriction to permit the pressure of the fluid to exert an opening force on said valve, means defining a chamber within the conduit upstream of said valve and in communication therewith, means forming a passage connecting said chamber with a pressure lower than the pressure of the fluid at the upstream end of the conduit, and means for opening and closing said passage whereby the fluid is admitted slowly from the conduit into the chamber to counterbalance the forces acting on the valve when the passage is closed but the pressure of the fluid exerts an opening force on the valve when the passage is open.

11. A flow regulating device comprising an outer venturi tube having inlet and discharge ends, an inner venturi tube accommodated within said outer venturi tube, the inner venturi tube having its inlet upstream of the throat of the outer venturi tube, the passage through the inner venturi tube forming one flow passage and the passage between the two venturi tubes forming another flow passage, a valve accommodated within said outer venturi tube downstream of the inlet end thereof and upstream of the inlet end of the inner venturi tube for regulating the flow through the inner venturi tube, said valve having a tapered surface exposed to the fluid within the conduit upstream of the throat of the outer venturi tube to permit the pressure of the fluid to exert an opening force on the valve, and means for guiding the valve for movement longitudinally within the outer venturi tube to open the inlet end of the inner venturi tube.

12. A flow regulating device comprising an outer venturi tube having inlet and discharge ends, an inner venturi tube accommodated within the outer venturi tube, the passage through the inner venturi tube forming one flow passage and the passage between the two venturi tubes forming another flow passage, the inlet end of the inner venturi tube being spaced downstream from the inlet end of the outer venturi tube, a valve accommodated within the outer venturi tube upstream of the throat thereof for regulating the flow through one but not the other of said flow passages, means defining a chamber within the outer venturi tube upstream of the valve, said valve being slidably accommodated at one end of said chamber and having a surface exposed to the fluid upstream of the throat to permit the pressure of the fluid to exert an opening force on the valve, and means for varying the pressure within said chamber.

13. A flow regulating device as set forth in claim 12 in which the means for varying the pressure within the chamber includes a vent passage for said chamber and an actuable valve for opening and closing said vent passage.

References Cited in the file of this patent

UNITED STATES PATENTS

| | | |
|---|---|---|
| 802,496 | Collin | Oct. 24, 1905 |
| 1,328,565 | Howard | Jan. 20, 1920 |
| 1,629,957 | Larner | May 24, 1927 |
| 1,631,481 | Gfeller | June 7, 1927 |
| 1,824,057 | Robertshaw | Sept. 22, 1931 |
| 2,687,145 | Carter | Aug. 24, 1954 |
| 2,772,691 | Hoffman | Dec. 4, 1956 |
| 2,813,545 | Garnik | Nov. 19, 1957 |

OTHER REFERENCES

| | | |
|---|---|---|
| 869,281 | Germany | Mar. 2, 1953 |

UNITED STATES PATENT OFFICE
CERTIFICATION OF CORRECTION

Patent No. 3,002,524            October 3, 1961

Fred W. Diesing et al.

It is hereby certified that error appears in the above numbered patent requiring correction and that the said Letters Patent should read as corrected below.

Column 4, line 62, for "Apparatus in accordance with claim 6, in which the" read -- A flow regulating device comprising a conduit having --.

Signed and sealed this 3rd day of April 1962.

(SEAL)
Attest:

ERNEST W. SWIDER            DAVID L. LADD
Attesting Officer            Commissioner of Patents